United States Patent
Taljaard (10) Patent No.: US 11,427,153 B2
(45) Date of Patent: Aug. 30, 2022

(54) VEHICLE ANTI-THEFT DEVICE

(71) Applicant: HARDCORE AUTOMOTIVE LOCKING TECHNOLOGIES (PTY) LTD, Nelspruit (ZA)

(72) Inventor: Philippus Petrus Erasmus Taljaard, Nelspruit (ZA)

(73) Assignee: Hardcore Automotive Locking Technologies (PTY) Limited, Nelspruit (ZA)

( * ) Notice: Subject to any disclaimer, the term of this patent is extended or adjusted under 35 U.S.C. 154(b) by 374 days.

(21) Appl. No.: 16/329,974

(22) PCT Filed: Dec. 12, 2016

(86) PCT No.: PCT/IB2016/057538
§ 371 (c)(1),
(2) Date: Mar. 1, 2019

(87) PCT Pub. No.: WO2018/042236
PCT Pub. Date: Mar. 8, 2018

(65) Prior Publication Data
US 2019/0202398 A1 Jul. 4, 2019

(30) Foreign Application Priority Data

Sep. 2, 2016 (ZA) .................................. 2016/06093
Sep. 28, 2016 (ZA) .................................. 2016/06693

(51) Int. Cl.
*B60R 25/06* (2006.01)
*B60R 25/24* (2013.01)
(Continued)

(52) U.S. Cl.
CPC .............. *B60R 25/06* (2013.01); *B60K 28/10* (2013.01); *B60R 25/04* (2013.01); *B60R 25/10* (2013.01);
(Continued)

(58) Field of Classification Search
CPC .......... E05B 77/00; E05B 77/44; E05B 79/02; E05B 79/04; E05B 81/00; E05B 81/02;
(Continued)

(56) References Cited

U.S. PATENT DOCUMENTS 1,363,676 A 12/1920 Schwemmer
1,476,437 A 12/1923 Barker
(Continued)

FOREIGN PATENT DOCUMENTS

DE 102004060817 3/2006
KR 10-2012-0076830 7/2012
WO WO 2008/007371 1/2008

OTHER PUBLICATIONS

International Search Report and Written Opinion prepared by the U.S. Patent and Trademark office dated Aug. 16, 2017, for International Application No. PCT/IB2017/053496 16 pages.
(Continued)

*Primary Examiner* — Christopher J Boswell
(74) *Attorney, Agent, or Firm* — Sheridan Ross P.C.

(57) ABSTRACT

An anti-theft device 10 is operatively connected to a vehicle drivetrain, downstream of a power plant. To this end, a gear 12 is mounted for rotation together with a driveshaft 13. The device 10 further includes a pivotally mounted locking pawl 17 which is movable relative to the gear 12 between an open position in which a profiled head 18 of the pawl 17 is spaced away from a periphery of the gear 12 such that the gear 12 is permitted to rotate freely together with the driveshaft 13, and a locked position, in which the profiled head 18 of the pawl 17 engages the gear 12 and prevents rotation thereof, thereby locking the driveshaft 13 in position. The device includes an actuator 23 and ECU 22 in a tamper-proof casing 27. The ECU controls engagement of the pawl depending upon a position of a handbrake and ignition switch.

14 Claims, 5 Drawing Sheets

(51) Int. Cl.
| | |
|---|---|
| *B60R 25/32* | (2013.01) |
| *B60R 25/20* | (2013.01) |
| *B60R 25/04* | (2013.01) |
| *B60K 28/10* | (2006.01) |
| *E05B 79/04* | (2014.01) |
| *B60R 25/33* | (2013.01) |
| *B60R 25/10* | (2013.01) |
| *B60R 25/25* | (2013.01) |
| *B60R 25/40* | (2013.01) |
| *E05B 81/18* | (2014.01) |

(52) U.S. Cl.
CPC ............ *B60R 25/20* (2013.01); *B60R 25/24* (2013.01); *B60R 25/25* (2013.01); *B60R 25/32* (2013.01); *B60R 25/33* (2013.01); *B60R 25/403* (2013.01); *E05B 79/04* (2013.01); *B60R 2025/0415* (2013.01); *B60R 2325/10* (2013.01); *B60R 2325/101* (2013.01); *B60R 2325/105* (2013.01); *B60R 2325/205* (2013.01); *E05B 81/18* (2013.01)

(58) Field of Classification Search
CPC .......... E05B 81/04; E05B 81/12; E05B 81/18; B60R 25/00; B60R 25/04; B60R 25/06; B60R 25/08; B60R 25/09; B60R 25/10; B60R 25/20; B60R 25/24; B60R 25/32; B60R 25/33; B60R 25/25; B60R 25/252; B60R 25/255; B60R 25/257; B60R 2325/10; B60R 2325/101; B60R 2325/105; B60R 2325/205; B60R 25/002; B60R 25/003; B60R 25/007; B60R 25/0211; B60R 25/0215; B60R 25/02156; B60R 2025/0405; B60R 2025/0415; B60K 28/00; B60K 28/10; F16H 61/22
See application file for complete search history.

(56) References Cited

U.S. PATENT DOCUMENTS

| | | | |
|---|---|---|---|
| 1,668,395 A | 5/1928 | Carpenter | |
| 1,687,475 A | 10/1928 | Gillenwaters | |
| 2,890,581 A * | 6/1959 | Lewis | B60T 1/005 70/248 |
| 2,992,693 A | 7/1961 | Peyton | |
| 5,020,344 A | 6/1991 | Garcia | |
| 5,714,807 A | 2/1998 | Albanes | |
| 5,827,149 A | 10/1998 | Sponable | |
| 5,828,297 A | 10/1998 | Banks et al. | |
| 6,095,310 A | 8/2000 | Voda et al. | |
| 6,107,937 A * | 8/2000 | Hamada | H04N 7/147 340/12.53 |
| 6,124,789 A * | 9/2000 | Barr | B60Q 9/001 340/438 |
| 6,125,671 A * | 10/2000 | Suzuki | B60R 25/02153 70/186 |
| 6,250,433 B1 * | 6/2001 | Sealine | B60T 1/005 180/273 |
| 6,279,713 B1 * | 8/2001 | Young | B60T 1/005 188/31 |
| 6,513,638 B2 | 2/2003 | Thyselius | |
| 6,589,134 B2 | 7/2003 | Williams et al. | |
| 6,885,290 B2 | 4/2005 | Tsuji | |
| 7,161,467 B2 * | 1/2007 | Takahashi | B60R 25/24 340/12.51 |
| 7,462,953 B2 * | 12/2008 | Kamiya | B60R 25/04 307/10.3 |
| 7,484,613 B2 | 2/2009 | Kim et al. | |
| 8,006,526 B2 | 8/2011 | Fort et al. | |
| 8,219,289 B2 | 7/2012 | Kamada et al. | |
| 8,275,511 B2 | 9/2012 | Kachouh et al. | |
| 8,281,681 B2 | 10/2012 | Kimura et al. | |
| 9,185,550 B2 | 11/2015 | Yamane et al. | |
| 9,404,563 B2 * | 8/2016 | Yamamoto | F16H 63/34 |
| 9,421,945 B1 | 8/2016 | Smathers | |
| 9,649,999 B1 | 5/2017 | Amireddy et al. | |
| 2002/0100300 A1 | 8/2002 | Reeb et al. | |
| 2003/0075391 A1 | 4/2003 | Oppitz et al. | |
| 2004/0107028 A1 | 6/2004 | Catalano | |
| 2004/0201461 A1 | 10/2004 | Parker et al. | |
| 2005/0155824 A1 | 7/2005 | Taba | |
| 2011/0193692 A1 | 8/2011 | Fong | |
| 2012/0016558 A1 * | 1/2012 | Ueno | B60R 25/08 701/51 |
| 2012/0041647 A1 | 2/2012 | Vujasinovic et al. | |
| 2015/0148990 A1 | 5/2015 | Patel | |
| 2015/0382160 A1 | 12/2015 | Slay, Jr. et al. | |
| 2017/0334393 A1 | 11/2017 | Hauslmann et al. | |
| 2019/0202398 A1 * | 7/2019 | Taljaard | B60R 25/04 |

OTHER PUBLICATIONS

International Preliminary Report on Patentability prepared by the U.S. Patent and Trademark Office dated Sep. 7, 2018, for International Application No. PCT/IB2017/053496 15 pages.
International Search Report prepared by the U.S. Patent and Trademark Office dated Apr. 15, 2017, for International Application No. PCT/IB2016/057538.
Written Opinion prepared by the U.S. Patent and Trademark Office dated Apr. 15, 2017, for International Application No. PCT/IB2016/057538.
International Preliminary Report on Patentability prepared by the U.S. Patent and Trademark Office dated Aug. 23, 2018, for International Application No. PCT/IB2016/057538.
Extended Search Report for European Patent Application No. 16915022.4, dated Oct. 30, 2020, 8 pages.
Official Action for U.S. Appl. No. 16/330,000, dated Mar. 12, 2021 51 pages.
Notice of Allowance for U.S. Appl. No. 16/330,000, dated Sep. 22, 2021 8 pages.

* cited by examiner

VEHICLE ANTI-THEFT DEVICE

CROSS REFERENCE TO RELATED APPLICATIONS

This application is a national stage application under 35 U.S.C. 371 and claims the benefit of PCT Application No. PCT/IB2016/057538 having an international filing date of 12 Dec. 2016, which designated the United States, which PCT application claimed the benefit of South Africa Patent Application No. 2016/06093 filed 2 Sep. 2016 and South Africa Patent Application No. 2016/06693 filed 28 Sep. 2016, the disclosure of each of which are incorporated herein by reference.

FIELD OF INVENTION

This invention relates to vehicle security and, more specifically, to a drivetrain locking mechanism for preventing theft of vehicles.

BACKGROUND OF INVENTION

Vehicle security is a multi-million rand industry. Many different theft deterrent devices have been developed over the years to prevent vehicle theft. Despite Inventors' best efforts vehicle theft is still rife in many countries and particularly so in South Africa. Many new vehicles come fitted with a sophisticated vehicle alarm system, immobiliser and/or GPS tracking unit. However, despite the inclusion of these devices and systems in vehicles, a large number of vehicles are still being stolen annually.

Although some stolen vehicles that were fitted with a tracking unit are recovered, often significant damage has already been done to the vehicle by thieves in an attempt to locate any possible tracking devices. Therefore, despite having recovered the stolen vehicle, repair costs are still exorbitant and many vehicle owners are reluctant to take a stolen and recovered vehicle back due to depreciation in its value.

Vehicle theft syndicates have found ways of breaking into vehicles and bypassing or disabling existing vehicle alarm systems within minutes. In some instances, the thieves carry a portable electronic control unit with them, specific to the vehicle being targeted, which allows them to disconnect and bypass the vehicle's existing alarm/immobiliser system. This means that they can quickly and relatively easily gain entry to the vehicle and bypass the existing vehicle alarm/immobiliser system and drive off within minutes, minimising the possibility of being caught in the act.

US 2011/0193692 discloses an anti-theft system for a vehicle which comprises an access controller 20, a lock mechanism 21 including a steering shaft lock 40 and a hood lock 60 and an alarm unit 25. The system comprises a programmable processor 201 which is configured to actuate a drive unit 50 which is configured to move a lock rack 57 into and out of engagement with a limit unit 53 or toothed collar which is mounted to the steering shaft in order to prevent unauthorised turning of the steering wheel. The access controller 20 further includes a handbrake sensor 234 amongst others. In the drawings, a handbrake cable is illustrated which mechanically engages the lock rack 57 to prevent engagement thereof with the toothed collar when the handbrake is disengaged. The access controller 20 is enclosed in a housing 203 besides a steering column and distal steering wheel. A drawback of this system is that once a thief has gained access to the vehicle cabin, the steering shaft lock 40 can easily be tampered with, bypassed or physically broken into and damaged, destroyed or rendered inutile due to the fact that it is located at an easily accessible position adjacent to the steering column. The lock 40 may also be broken off using sheer force in order to free up rotation of the steering wheel.

U.S. Pat. No. 8,006,526 teaches a steering shaft lock actuator including at least one motor drivingly connected to a locking pawl and a housing for a least partially enclosing the motor, a drivetrain, the locking pawl and a locking pin. The drivetrain is configured linearly to urge the locking pawl and the locking pin between a locked position wherein the locking pawl and locking pin extend at least partially out of the housing and an unlocked position wherein the locking pawl and the locking pin are retracted toward the housing relative to the locked position. The locking pawl is positioned to prevent rotational movement of the steering shaft when in the locked position. A downside of the steering shaft lock actuator is that it is located within the vehicle cabin which is within reach of a driver or thief inside the cabin. This renders it susceptible to tampering or breakage through the use of force. Through the use of brute force the housing and mechanism can be broken off from the steering column once access has been obtained by removing dash or steering column panels.

U.S. Pat. No. 1,476,437 discloses a shaft locking means which operates purely mechanically in order to lock and unlock a steering shaft or other shafts. The steering shaft lock requires the use of a key inserted into a keyhole to lock and unlock the shaft locking means. When the key is turned, a locking pawl is moved into or out of engagement with a toothed collar around the shaft to be locked. One drawback is that the locking pawl only prevents rotation in one direction. The shaft locking means has the drawback of lack of integration with a vehicle's existing electronic alarm or control system and requires manual locking and unlocking through the use of a physical key.

Thieves have managed to bypass or otherwise disable most anti-theft mechanisms which are either directed toward disabling or preventing the use of peripheral driving controls of the vehicle such as the gear lever, pedals or steering wheel or immobilising the vehicle by electrically or electronically interrupting power supply to critical components such as pumps or motors in the event that predetermined alarm or start conditions are not satisfied. All of these devices or systems are installed upstream of the power plant or engine or drivetrain of the vehicle. Therefore, if the thief manages to supply the immobilised components with power directly, or manages to disable the anti-theft mechanisms themselves, the vehicle can be started. This is sometimes achieved by hot-wiring the fuel pump, for example, directly from the battery leads.

Only a couple of inventions of which the Applicant is aware have suggested devices which are to be installed downstream of the power plant or engine of the vehicle. A couple of them and their drawbacks have been discussed below.

U.S. Pat. No. 2,992,693 describes a drive shaft lock for an automobile which is designed automatically to engage when an operator opens a vehicle door without placing the transmission handle in the "park" position. This is to prevent vehicle runaway. A rod is configured to protrude through one of a number of holes formed in a periphery of a circular disc attached to the driveshaft. A speed governor opens a microswitch which prevents engagement of the rod when the vehicle is in motion. Power to the ignition switch is turned off when the vehicle door is opened. Unfortunately, this driveshaft lock is not suitable for use a theft-deterrent as the rod and disc are exposed and can easily be tampered with to prevent insertion of the rod into any of the holes or to retract the rod from the holes, if it had previously engaged the disc. Furthermore, the disc can easily be removed or loosened by removing the set screw. U.S. Pat. No. 2,992,693 also does not teach integration of the system with an electronic vehicle alarm or control system which includes the use of a processor or electronic control unit.

U.S. Pat. No. 1,668,395 describes a shaft lock for an automobile. This locking device is designed to inter-engage the driveshaft of a vehicle at some point beyond the clutch so as to lock the rear wheels against forward motion without interfering with the operation of the engine or clutch. The locking device only prevents rotation in one direction when engaged with the driveshaft. A neck of the locking device projects through an opening in the floor of the passenger compartment and requires physical manipulation through rotation by hand in order to engage/disengage the locking device. Operation of the locking device is awkward and cumbersome and deters operators from using it.

The Applicant has identified a need for a vehicle anti-theft device which overcomes the above drawbacks. The present invention aims to address the above problems, at least to some extent.

SUMMARY OF INVENTION

In accordance with the invention there is provided an anti-theft device for a vehicle which includes a power plant and a drivetrain, the power plant being drivingly connected to the drivetrain in order to propel the vehicle, the anti-theft device including:
- a locking member which is mounted adjacent to the drivetrain, downstream of the power plant, and which is movable relative to the drivetrain between an open position in which a driveshaft or transmission of the drivetrain is permitted to move relative to the locking member and an engaged or locked position in which the locking member prevents displacement of the driveshaft or transmission relative to the locking member;
- an actuator which is configured to displace the locking member relative to the drivetrain from one of its open or locked positions to the other; and
- an electronic control unit which is communicatively linked to the actuator and is configured to receive a first signal indicative of whether or not power to the power plant is cut off and a second signal indicative of whether or not the drivetrain is in motion, wherein the electronic control unit is further configured to actuate the actuator in order to move the locking member into its locked position provided that power to the power plant is cut off and the vehicle is not in motion or is moving at a rate which is below a predetermined threshold value.

When in its locked position, the locking member may engage the driveshaft or transmission and may prevent relative angular displacement of the driveshaft or transmission.

The second signal received by the electronic control unit indicative of whether or not the drivetrain is in motion may be derived from a handbrake or parkbrake of the vehicle. The second signal may be indicative of a position of the handbrake or parkbrake, i.e. engaged or disengaged.

The first signal received by the electronic control unit indicative of whether or not power to the power plant is cut off, may be derived from a vehicle ignition switch. The first signal may be indicative of a position of the vehicle ignition, i.e. on or off.

The electronic control unit may be a processor. The electronic control unit may be configured automatically to actuate the actuator in order to move the locking member into its locked position when the electronic control unit detects that a vehicle ignition is turned off and a handbrake or parkbrake is engaged.

The device may include a remote control which is communicatively coupled to the electronic control unit and which is configured to actuate the actuator in order to move the locking member between its respective positions. The device may accordingly be remotely actuatable.

In response to receipt of a control signal from the remote control by the electronic control unit, the locking member may be moved to its open position.

The device may further include a wireless communication module which is communicatively linked to the electronic control unit and is configured to communicate with the remote control. The communication module may include any one or more of a satellite tracking unit, a satellite transceiver, a Bluetooth module, a RFID transceiver, a GSM-enabled module and a Wi-Fi module such that signals and commands can be sent to and received from the device via a satellite and/or cellular communication network via the communication module which is coupled to the electronic control unit.

The device may also include a biometric reader whereby the electronic control unit is configured to authenticate a user prior to deactivating or disengaging the locking member.

The locking member may include a locking pawl. The pawl may be pivotally displaceable relative to a toothed rotor of the drivetrain of the vehicle. The pawl may have a head which is profiled to mate with a periphery of the toothed rotor when in its locked position, in order to prevent rotation of the rotor.

The device may include a retro-fittable tamper-proof casing which at least partially surrounds the locking member, actuator and the electronic control unit. The toothed rotor may be mounted to the driveshaft of the vehicle beyond a clutch.

A back-up battery may be housed within the casing. The tracking unit may also be housed within the casing. The toothed rotor may be a toothed gear which is configured to be retrofitted around the driveshaft. The gear may comprise at least two parts which are connectable around the driveshaft, using fasteners, for rotation together with the driveshaft.

At least the locking member may be housed within a transmission casing of the drivetrain.

The locking pawl may be spring-biased to its open position. Due to profiling of the head of the pawl and the toothed rotor, the pawl may be unable to engage the rotor whilst it is rotating at a velocity beyond a predetermined engagement threshold velocity. The actuator may be in the form of a solenoid which is configured to displace a pin which, in turn, is configured to urge the pawl into engagement with the toothed rotor.

The electronic control unit of the anti-theft device may be communicatively linked to a vehicle alarm control unit such that when the vehicle alarm is disarmed, the locking member of the anti-theft device is moved to its open position.

The invention extends to a method of retrofitting an anti-theft device to a vehicle for preventing vehicle theft, the vehicle including a power plant and a drivetrain, the power plant being drivingly connected to the drivetrain in order to propel the vehicle, the method including:

retrofitting a toothed rotor to a driveshaft of the drivetrain of the vehicle for rotation together with the driveshaft;

mounting a locking member to the vehicle in close proximity to the rotor, the locking member being movable by way of an actuator coupled to an electronic control unit between a locked position in which it engages the rotor and prevents rotation thereof and an open position in which the rotor is permitted to rotate freely;

at least partially enclosing the rotor and locking member with a casing in order to prevent tampering;

coupling a handbrake of the vehicle as input to the electronic control unit of the device; and     coupling an ignition switch of the vehicle as input to the electronic control unit of the device, wherein the electronic control unit is configured to actuate the actuator in order to move the locking member into its locked position when the ignition switch is turned off and the handbrake is engaged.

The invention also extends to a method of securing a vehicle against vehicle theft, the method including:

providing an anti-theft device as described above fitted to a drivetrain of the vehicle; and     automatically engaging or activating the device by moving the locking member into its locked position upon detecting, using the electronic control unit, that the handbrake or parkbrake of the vehicle is engaged and the ignition is turned off.

BRIEF DESCRIPTION OF DRAWINGS

The invention will now be further described, by way of example, with reference to the accompanying diagrammatic drawings.

In the drawings.

DETAILED DESCRIPTION OF AN EXAMPLE EMBODIMENT

The following description of the invention is provided as an enabling teaching of the invention. Those skilled in the relevant art will recognise that many changes can be made to the embodiments described, while still attaining the beneficial results of the present invention. It will also be apparent that some of the desired benefits of the present invention can be attained by selecting some of the features of the present invention without utilising other features. Accordingly, those skilled in the art will recognise that modifications and adaptations to the present invention are possible and can even be desirable in certain circumstances, and are a part of the present invention. Thus, the following description is provided as illustrative of the principles of the present invention and not a limitation thereof.

The term "drivetrain" should be understood to mean the group of components that deliver power to the driving wheels including a vehicle transmission, couplings, driveshaft or propeller shaft, arms and rods. The term "transmission" should be understood to include a vehicle gearbox and differential.

In the figures, reference numeral 10 refers generally to an anti-theft device for a vehicle which is intended to prevent vehicle theft. The device 10 which may also be referred to as a drivetrain or driveshaft lock is fitted to a drivetrain of the vehicle, downstream of or after a power plant which is drivingly connected to the drivetrain. In the example embodiment illustrated in the drawings, the anti-theft device 10 is mounted adjacent to a driveshaft of the drivetrain downstream of a vehicle transmission or gearbox. It will be appreciated, however, that the device 10 may be accommodated wholly, or at least in part, within the vehicle transmission. Accordingly, the device 10 may be incorporated into a gearbox or differential of the vehicle. The Applicant believes that conventional alarm systems which are configured to immobilise a vehicle by interrupting power to electrical components of either the ignition or starter are easier to bypass than when a physical, concealed lock has been applied to the drivetrain of the vehicle, specifically to a latter portion thereof. In other words, despite the use of mechanical locks to prevent functioning of vehicle controls such as pedals or a steering wheel, for example, it is still possible to steal the vehicle by towing it away. The present invention aims to overcome this drawback.

In an example embodiment of the device 10, in accordance with the invention, illustrated in the drawings, a drivetrain of the vehicle is provided with a toothed rotor or gear 12 which is mounted around a drive or prop shaft 13 of the vehicle, downstream of a clutch, for rotation together with the driveshaft 13 about a shaft axis. In a configuration illustrated in FIG. 1, the anti-theft device 10 is retrofitted to the vehicle. The scope of the invention also extends to an anti-theft device which is fitted upon assembly of the vehicle.

Figure 1:
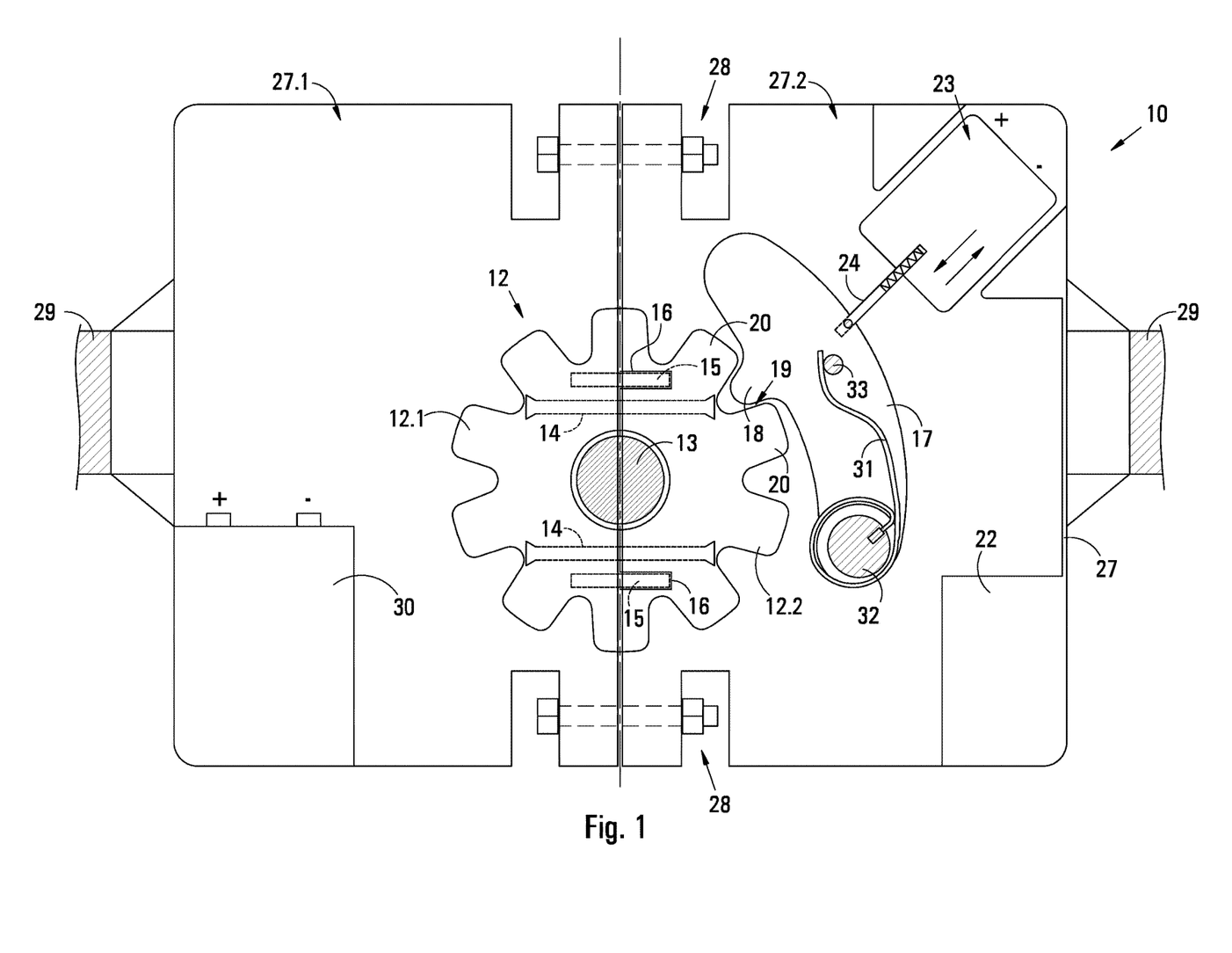
FIG. 1 shows a cross-sectional view through a driveshaft to which a vehicle anti-theft device in accordance with the invention has been fitted.

The gear 12 comprises two parts 12.1, 12.2 which are mounted around the driveshaft 13 and secured thereto using set screws 14. In order to ensure accurate fitment or location of the parts 12.1, 12.2, the parts may include complementary locating formations. To this end, one part 12.1 includes one or more male mating formations in the form of protruding pins 15 and the corresponding part 12.2 includes complementary female mating formations in the form of sockets 16. The set screws 14 may be countersunk into the gear 12.

The toothed gear 12 is annular and may have keyways (not shown) which can be axially slid over splines in the shaft 13 in order to mount the gear 12 thereto. Alternatively, the gear 12 may be integrally formed with the driveshaft 13 upon or after manufacture. The device 10 further includes a locking member in the form of pivotally mounted locking pawl 17. The pawl 17 is pivotally displaceable relative to the toothed gear 12 between an open position (not shown) in which a profiled head 18 of the pawl 17 is spaced away from a radially outer periphery of the gear 12 such that the gear 12 is permitted to rotate freely together with the driveshaft 13; and a locked position, shown in FIG. 1, in which the profiled head 18 of the pawl 17 engages the gear 12 and is received within a space 19 defined between adjacent teeth 20 of the gear 12 and prevents rotation of the gear 12, thereby locking the driveshaft 13 in position.

The anti-theft device 10 further includes an actuator 23 and an electronic control unit 22 which is communicatively linked to the actuator 23. In the example embodiment illustrated in the drawings, the actuator 23 is in the form of an electrically operated linear actuator or solenoid having an extendable/retractable pin 24 or plunger. The pin 24 is spring loaded and is configured to bear against a rear face of the locking pawl 17 in order to urge it into engagement with the gear 12 when the device 10 is locked or activated.

The electronic control unit 22 is communicatively linked to the solenoid and is configured to actuate the solenoid when needed, i.e. when the device is to be locked. In an alternative embodiment of the device which has not been illustrated, the actuator may take on the form of an electrical motor which is drivingly connected to a pin which is slidably displaceable within a guide or sleeve between an extended and retracted position in response to rotation of a worm gear by the motor. In this manner, the pin 24 and hence the locking pawl 17 can be passively held in its extended position or locked position, as shown in FIG. 1, without requiring application of power or energy to maintain the pawl 17 in the locked position, as is the case with the solenoid.

Figure 2:
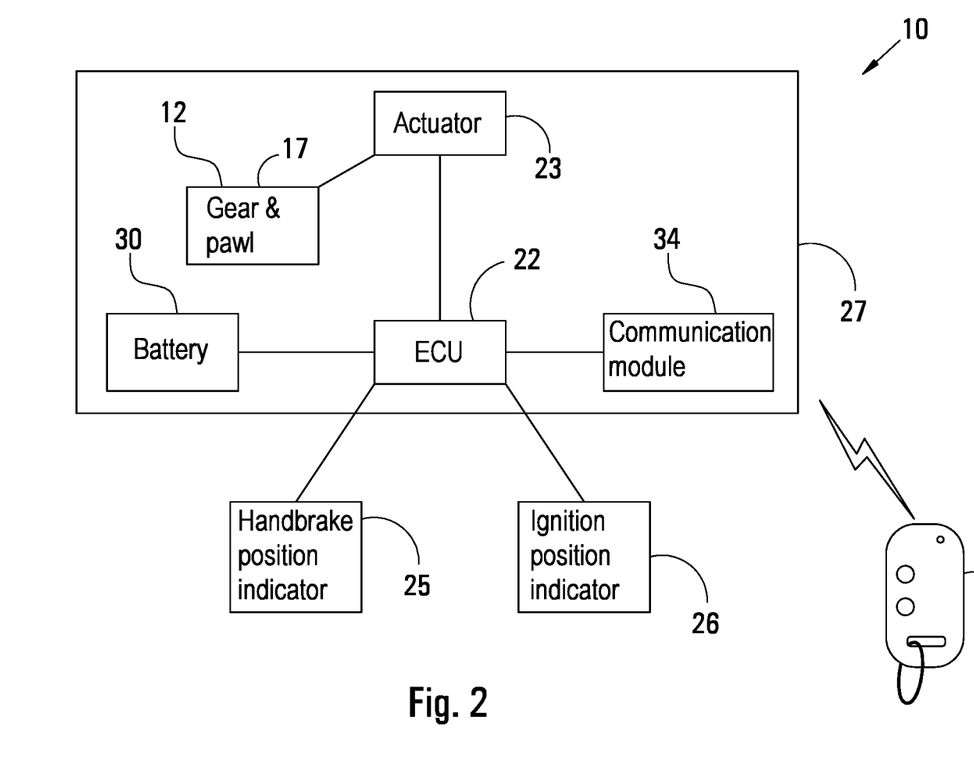
FIG. 2 shows a conceptual block diagram of the anti-theft device.

The electronic control unit (ECU) 22 includes a processor which may be in the form of a microprocessor which is configured to receive as inputs a first signal indicative of whether or not power to the power plant is cut off. The signal may also be indicative of whether or not power from the power plant to the driveshaft is cut off. This first signal is derived from a vehicle ignition switch or position indicator 26 and is indicative of a position of the vehicle ignition, i.e. on or off. The ECU 22 is also configured to receive a second signal indicative of whether or not the drivetrain is in motion. This second signal is derived from a handbrake or parkbrake of the vehicle and is indicative of a position of the handbrake or parkbrake 25 of the vehicle, i.e. engaged or disengaged. This second signal may also be derived from a GPS or on-board tracking device. Preferably these signals are in the form of electrical input signals or voltage signals which are input to the microprocessor (ECU) 22 (see FIG. 2).

Figure 3:
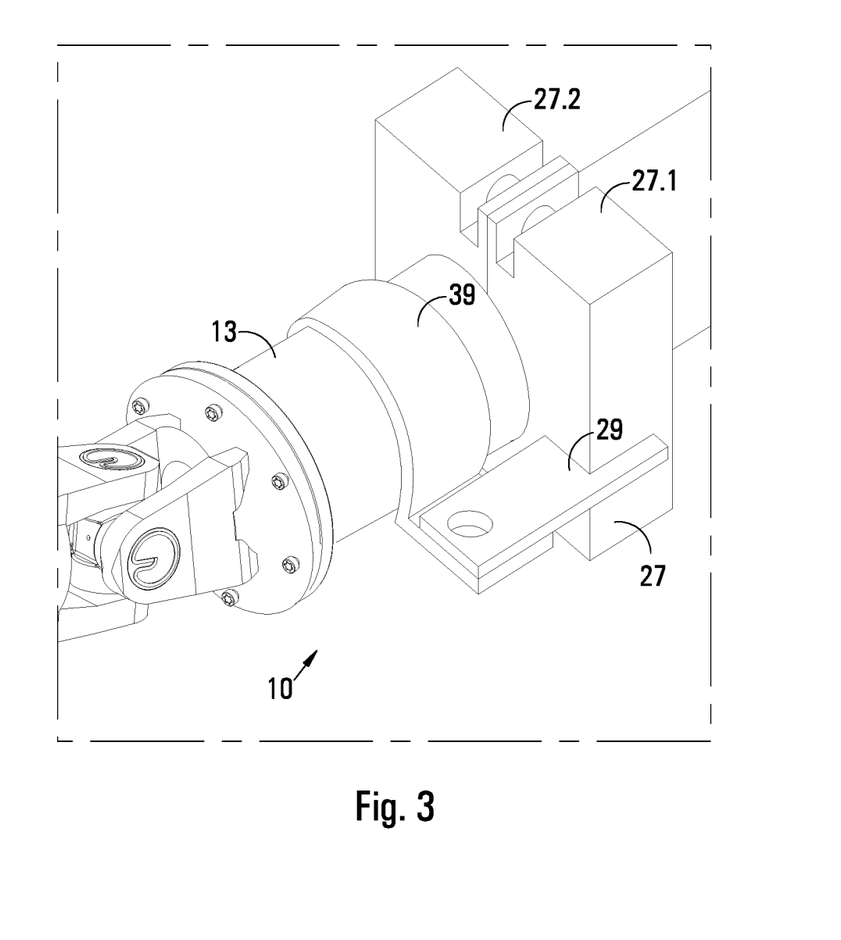
FIG. 3 shows a three-dimensional view of a driveshaft to which the anti-theft device of FIG. 1 has been mounted.

In order to restrict access to the gear 12 and especially to the locking pawl 17, these two components, together with the other components of the device 10 such as the actuator 23 and ECU 22 are enclosed in a robust, secure, tamper-proof casing 27 which is mounted to an underside of the vehicle around the driveshaft 13, proximate a centre bearing support 39 (see FIG. 3) of the drivetrain by way of brackets 29. The driveshaft 13 effectively passes through the casing 27, the casing 27 wrapping around the shaft. The casing 27 comprises two halves or parts 27.1, 27.2 which are secured together using obscured or concealed bolts and nuts 28. Lock nuts and bolts 37 which require the use of a special key or adapter to loosen or tighten are preferably used to secure the parts of the casing 27 together to prevent unauthorised removal thereof. The casing 27 is held in place by a number of the mounting brackets 29 which extend away from the casing 27 and are attached to centre bearing mountings.

The electrical components of the device 10 are powered from the vehicle power supply. However, the device 10 further includes a back-up battery 30 which is housed within the casing 27 to provide back-up power when power from the vehicle power supply is interrupted for whatever reason.

In order to prevent accidental or unintentional engagement of the locking pawl 17 with the gear 12 whilst the vehicle is in motion or the driveshaft 13 is rotating, the pawl 17 is spring biased to its open position using a spring 31, one end of which is coiled around and connected to a journaled pivot axle 32 which is connected to the casing 27. An opposite end of the spring 31 bears against or engages a protruding arm 33 of the pawl 17 and urges it into its open position. The casing 27 has opposing apertures (not shown) which are sized to accommodate the driveshaft 13. Faces of adjacent teeth 20 of the gear 12 that define the spaces 19 between them and the head 18 of the pawl 17 are purposefully shaped such that the head 18 cannot engage the gear 12 when the gear 12 is rotating above a threshold angular velocity or speed. This serves as an additional safety mechanism as engagement of the pawl 17 whilst the gear 12 is rotating at high speed could cause significant mechanical damage or failure of the components of the device 10. The spring-loaded pin 24 of the solenoid will ensure engagement of the pawl 17 with the gear 12 once the gear 12 rotates in any direction, in the event that the head 18 of the pawl 17 is misaligned with the spaces 19 between the teeth 20 of the gear 12 when the device 10 is locked.

The anti-theft device 10 is configured to be remotely activated or deactivated, i.e. primed to lock or unlocked. To this end, the device 10 includes a communication module 34 (see FIG. 2). The module 34 is in the form of wireless communication module which is communicatively linked to the electronic control unit 22. Alternatively, the module may form part of the electronic control unit 22, i.e. be integrated with the electronic control unit 22.

The device 10 therefore includes a remote control which is configured to control operation of the lock by communicating with the communication module 34. The remote control may be in the form of a conventional radio signal remote control 35, RFID tag, proximity sensor or even a user's mobile phone or smartphone. The device 10 is configured to activate or lock, i.e. displace the locking pawl 17 into its locked position in which it engages the gear 12 and prevents rotation thereof, automatically upon detection by the electronic control unit 22 that the ignition is turned off and the handbrake is engaged via the indicators or signals 25, 26 coupled to the ECU 22. Also, the device 10 may be primed to lock in response to receipt of a control signal from the remote device 35 by the electronic control unit 22, in which case the pawl 17 will lock as soon as the ignition is turned off and the handbrake is engaged. In response to receipt of a different (unlock) control signal from the remote control 35 by the ECU 22, the locking pawl 17 is moved to its open position, in which the gear 12 is free to rotate relative to the pawl 17, through retraction of the pin 24 of the solenoid 23 which permits the pawl 17 to be returned to its open position in which it is spaced away from the gear 12, due to the influence of the spring 31, i.e. the device is unlocked. Accordingly, in response to receipt of a control signal from the remote device 35, the electronic control unit 22 is configured to activate/deactivate or lock/unlock the device 10.

In an alternative configuration, the communication module 34 may be in the form of a satellite tracking unit or GPS. Accordingly, commands may be sent to and received from the device 10 via a satellite and/or cellular communication network via the tracking unit or communication module 34 which is coupled to the electronic control unit 22 of the device 10. The tracking unit is securely housed within the casing 27 where it cannot be reached, removed or tampered with. The communication module 34 may also take on the form of any one selected from the group comprising a satellite transceiver, Bluetooth module, RFID transceiver, GSM-enabled module, Wi-Fi module or any other suitable wireless communication module. Furthermore, the device 10 may include a biometric reader (not shown), e.g. fingerprint reader which is configured to authenticate a user prior to deactivating the device 10.

In a preferred configuration of the device 10, it is configured to lock automatically when the vehicle ignition is turned off and the handbrake is engaged. The pawl 17 which engages the gear 12 under influence of the solenoid when in its locked position therefore prevents rotation of the driveshaft 13 which means the rear wheels of the vehicle cannot rotate. This effectively immobilises the vehicle. Even if a thief manages to start the vehicle, he won't be able to drive away because the driveshaft 13 is fixed or locked in position by the pawl 17. The device 10 is also effective against towing as the front wheels are generally suspended to tow a vehicle which means the rear wheels need to be able to rotate to tow the vehicle. In this instance, the vehicle cannot be towed away whilst the device 10 is engaged because the rear wheels cannot rotate freely.

In an alternative configuration of the device 10, activation or priming of the device 10 is controlled using the remote control 35. When a control signal is received from the remote control 35 to lock the pawl 17, the device 10 is effectively primed and as soon as the inputs 25, 26 to the electronic control unit 22 indicate that the handbrake has been engaged and the ignition is turned off, the actuator 23 will actuate and displace the pawl 17 into engagement with the gear 12 in order to lock it in position. When an unlock control signal is received from the remote control 35, the electronic control unit 22 communicates with the solenoid in order to retract the pin 24 which allows the pawl 17 to be pivotally displaced away from the gear 12 under the influence of the spring 31. The driveshaft 13 can then rotate freely again. In the event that the vehicle is stolen because the device 10 was not engaged, an owner or service provider could, at the request of the owner, engage, prime or lock the device 10 remotely by forwarding a command to the electronic control unit 22 via the tracking unit or communication module 34 housed within the casing 27. In other words, as soon as the ignition is shut-off and the handbrake is engaged, the pawl 17 will move to its locked position. The device 10 can also be integrated with the vehicle's existing alarm system. In other words, when a user locks his vehicle using his vehicle remote control, the device may simultaneously be engaged or locked. This can easily be achieved by linked the ECU 22 with the vehicle alarm system. An indicator in the form of a light is provided inside the cabin of the vehicle to indicate to the driver when the device 10 is engaged or locked. The device 10 may further be configured to warn a driver who attempts to start the vehicle that the device 10 is locked to prevent damage to the drivetrain or clutch. Furthermore, unlocking of the device 10 may be a condition for the vehicle to start. In other words, the vehicle won't start until the device 10 is unlocked.

Figure 4:
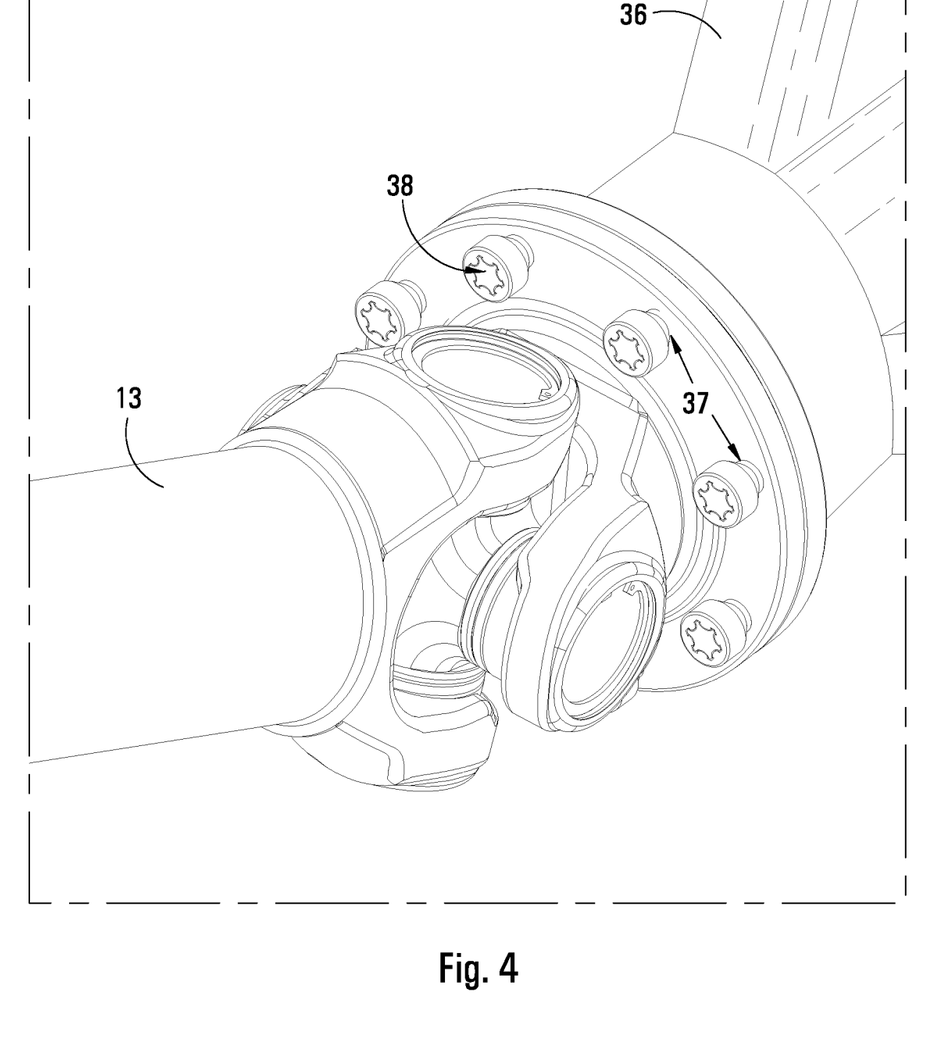
FIG. 4 shows a three-dimensional view of a coupling of a rear end of the driveshaft to a differential unit.
Figure 5:
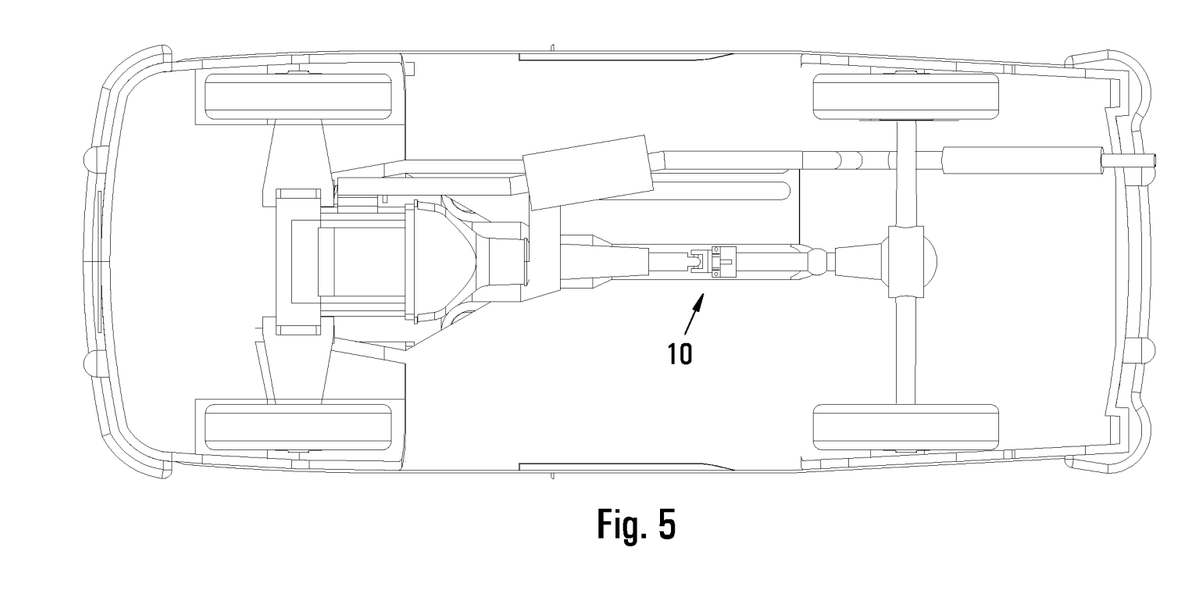
FIG. 5 shows an underside of a vehicle to which the anti-theft device of FIG. 1 has been fitted.

Turning now to FIG. 4, in order to prevent unauthorised disconnection of the driveshaft 13, conventional fasteners used to secure the driveshaft 13 to a differential unit 36, are replaced with a number of specialised keyed lock nuts and bolts 37. The bolts have a specialised head 38 which defines an unusual socket which cannot be accessed or engaged using a normal spanner. The nuts have a similar head which necessitates the use of a purpose-built key in order to tighten or loosen the nuts. In this way unauthorised disconnection of the prop shaft from the differential is prevented. The same lock nuts and bolts may be used to secure the casing 27 as well as central and fore linkages of the driveshaft 13 with the remainder of the drivetrain. Unauthorised disconnection of the prop shaft downstream of the device 10 would effectively bypass the device 10 because it would free up rotation of the rear wheels of the vehicle which would allow towing.

The robust metal casing 27 of the device 10 is located below the vehicle which means access to it is restricted unlike a steering shaft lock which can easily be tampered with or physically broken due to the fact that it is located at an easily accessible location adjacent to the steering column. In the embodiment of the invention in which the pawl 17 is enclosed in a transmission housing, it is even more difficult for a thief to gain access to it. Generally a hoist or jack is required to gain access to parts located below the vehicle. Furthermore, the casing 27 prevents tampering with the components of the device 10 itself such as the actuator 23, gear 12, pawl 17 and electronic control unit 22. Electronic/electrical and automatic actuation of the actuator 23 in order to lock or unlock the device 10 makes the device simple to use because it does not require manual manipulation to engage and disengage the locking member. Furthermore, the communication module 34 enables remote control of the device 10 even when the owner is not in close proximity to the vehicle. For example, in the event that the vehicle has been stolen, the owner can still prime the device 10 to lock it as soon as the ignition has been turned off. Engagement of the locking pawl 17 whilst the vehicle is in motion is undesirable and dangerous. Instead of the handbrake position indicator, the tracking unit or GPS data can be used as an input to the ECU 22 to establish whether or not the vehicle is in motion. Furthermore, the device 10 can be integrated with an existing vehicle alarm system so that it locks and unlocks together with the conventional alarm. The Applicant believes that the vehicle anti-theft device 10 in accordance with the invention will be a more effective vehicle theft deterrent than conventional anti-theft vehicle systems because it is difficult to bypass and fixates the entire driveshaft which immobilises the driven wheels of the vehicle and prevents towing. The first objective of a vehicle thief is to gain entry to the vehicle cabin. However, through the use of this anti-theft device 100, a thief would still not be able to drive the vehicle or disable or disengage the locking member despite having gained entry to the vehicle cabin.

The invention claimed is:

1. An anti-theft device for a vehicle which includes a power plant and a drivetrain, the power plant being drivingly connected to the drivetrain in order to propel the vehicle, the anti-theft device including:
   a locking member which is mounted adjacent to the drivetrain, downstream of the power plant, and which is movable relative to the drivetrain between an open position in which a driveshaft or transmission of the drivetrain is permitted to move relative to the locking member and an engaged or locked position in which the locking member prevents displacement of the driveshaft or transmission relative to the locking member by engaging the drivetrain or transmission thus preventing rotation thereof and locking it in position hence immobilising the vehicle;
   an actuator which is configured to displace the locking member relative to the drivetrain from one of its open or locked positions to the other;
   an electronic control unit which is communicatively linked to the actuator and is configured to receive a signal indicative of whether or not the drivetrain is in motion; and
   a wireless communication module which is communicatively linked to the electronic control unit and is configured to communicate with a remote control, the anti-theft device accordingly being remotely actuatable, wherein the electronic control unit is further configured to actuate the actuator in order to automatically, without requiring prior manual intervention from an operator, move the locking member into its locked position in which the locking member prevents displacement of the driveshaft or transmission relative to the locking member provided that the vehicle is not in motion or is moving at a rate which is below a predetermined threshold value, and wherein the electronic control unit, actuator and locking member are housed within a tamper-proof casing, downstream of the power plant, wherein the locking member is displaceable relative to a toothed rotor of the drivetrain of the vehicle, the locking member being profiled to mate with the toothed rotor when in its locked position, in order to prevent rotation of the rotor, and wherein the toothed rotor is mounted to the driveshaft of the vehicle beyond a clutch.

2. An anti-theft device as claimed in claim 1, wherein the wireless communication module is also housed within the tamper-proof casing.

3. An anti-theft device as claimed in claim 2, wherein the remote control is communicatively coupled to the electronic control unit and is configured to actuate the actuator in order to move the locking member between its respective positions.

4. An anti-theft device as claimed in claim 3, wherein, in response to receipt of a control signal from the remote control by the electronic control unit, the locking member is moved to its open position.

5. An anti-theft device as claimed in claim 3, wherein the wireless communication module includes any one or more of a satellite tracking unit, a satellite transceiver, a Bluetooth module, a RFID transceiver, a GSM-enabled module and a Wi-Fi module such that signals and commands can be sent to and received from the device via a satellite and/or cellular communication network via the wireless communication module which is coupled to the electronic control unit.

6. An anti-theft device as claimed in claim 5, which includes a back-up battery housed within the casing.

7. An anti-theft device as claimed in claim 6, wherein the tracking unit is housed within the casing.

8. An anti-theft device as claimed in claim 1, wherein the signal received by the electronic control unit indicative of whether or not the drivetrain is in motion is derived from a handbrake or parkbrake of the vehicle, the signal being indicative of a position of the handbrake or parkbrake, i.e. engaged or disengaged.

9. An anti-theft device as claimed in claim 8, wherein the electronic control unit is configured automatically to actuate the actuator in order to move the locking member into its locked position when the electronic control unit detects that a vehicle ignition is turned off and the handbrake or parkbrake is engaged.

10. An anti-theft device as claimed in claim 1, which includes a biometric reader whereby the electronic control unit is configured to authenticate a user prior to deactivating or disengaging the locking member.

11. An anti-theft device as claimed in claim 1, wherein the toothed rotor is a toothed gear which is configured to be retrofitted around the driveshaft, the gear comprising at least two parts which are connectable around the driveshaft, using fasteners, for rotation together with the driveshaft.

12. An anti-theft device as claimed in claim 1, wherein at least the locking member is housed within a transmission casing of the drivetrain.

13. An anti-theft device as claimed in claim 1, wherein the locking pawl is spring-biased to its open position and wherein, due to profiling of the head of the pawl and the toothed rotor, the pawl is unable to engage the rotor whilst it is rotating at a velocity beyond a predetermined engagement threshold velocity, the actuator being in the form of a solenoid which is configured to displace a pin which, in turn, is configured to urge the pawl into engagement with the toothed rotor.

14. An anti-theft device as claimed in claim 1, wherein the electronic control unit of the anti-theft device is communicatively linked to a vehicle alarm control unit such that when the vehicle alarm is disarmed, the locking member of the anti-theft device is moved to its open position.

\* \* \* \* \*